United States Patent [19]

Atkinson

[11] Patent Number: 4,913,368
[45] Date of Patent: Apr. 3, 1990

[54] FILM CASSETTE

[75] Inventor: William C. Atkinson, Webster, N.Y.

[73] Assignee: Eastman Kodak Company, Rochester, N.Y.

[21] Appl. No.: 379,745

[22] Filed: Jul. 14, 1989

[51] Int. Cl.⁴ .................. G03B 1/00; G03B 17/26; B65D 85/67

[52] U.S. Cl. .................. 242/71.1; 206/409; 242/197; 354/277

[58] Field of Search .......... 206/389, 409, 413; 242/1, 71.1, 71.8, 195, 197; 354/212, 275, 277; 352/75, 76, 72

[56] References Cited

U.S. PATENT DOCUMENTS

| | | |
|---|---|---|
| 1,531,182 | 3/1925 | Hartmann . |
| 1,676,037 | 7/1928 | Lowkrantz . |
| 2,537,883 | 1/1951 | Ernisse .................. 242/71.1 |
| 3,092,346 | 6/1963 | Goodell et al. .................. 242/197 |
| 3,147,681 | 9/1964 | Sanderson .................. 242/71.1 |
| 3,213,775 | 10/1965 | Rehn . |
| 3,537,376 | 11/1970 | Fleming et al. .................. 354/277 |
| 3,594,512 | 7/1971 | Castagna .................. 242/197 X |
| 3,604,657 | 9/1971 | Igarashi .................. 242/195 |
| 3,690,582 | 9/1972 | Duvall .................. 242/71.1 |
| 3,943,536 | 3/1976 | Oshima .................. 354/204 |
| 3,980,254 | 9/1976 | Coon et al. .................. 242/195 |
| 4,074,870 | 2/1978 | Kaufman .................. 242/1 |
| 4,383,660 | 5/1983 | Richard et al. .................. 242/197 |
| 4,576,279 | 3/1986 | Ferderber .................. 206/409 X |
| 4,746,943 | 5/1988 | Kohl .................. 354/215 |
| 4,832,197 | 5/1989 | Hara .................. 206/409 |

FOREIGN PATENT DOCUMENTS

| | | |
|---|---|---|
| 339067 | 10/1920 | Fed. Rep. of Germany ...... 354/277 |
| 2711454 | 9/1978 | Fed. Rep. of Germany ...... 354/275 |
| 835300 | 12/1938 | France .................. 354/277 |

Primary Examiner—Bryon Gehman
Attorney, Agent, or Firm—Roger A. Fields

[57] ABSTRACT

A film cassette is disclosed wherein a filmstrip in roll form is stored within the cassette shell and has a leader portion that projects from an exterior end of a film passage slit in the cassette shell to permit the filmstrip to be drawn out of the shell. According to the invention, a tow bar is secured to the leader portion. The tow bar normally is positioned in covering relation with the exterior end of the film passage slit to prevent the leader portion from being moved into the cassette shell and includes an engageable portion which may be engaged in a camera, for example, to separate the tow bar from the cassette shell to draw the filmstrip out of the shell for exposure purposes.

3 Claims, 2 Drawing Sheets

FILM CASSETTE

BACKGROUND OF THE INVENTION

1. Field of the Invention

The invention relates generally to the field of photography and more particularly to film cassettes for roll film.

2. Description of the Prior Art

Light-trapped metal or plastic containers for a length of film to enable it to be loaded into a camera in full light are well known.

In the standard 35 mm type cassette, such as manufactured by Eastman Kodak Company, the filmstrip is stored in roll form on a flanged supply spool rotatably supported within a cylindrical cassette shell. A leader portion of the filmstrip, approximately two to two and one-half inches long, projects from an exterior end of a slit or "mouth" of the cassette shell defined by a relatively short pair of lip-like substantially parallel extensions of the shell. A light-trapping velvet or plush lines the interior sides of the lips and usually protrudes slightly beyond respective forward tips of the lips. When the film cassette is placed in the loading chamber of a camera, the leader portion is either manually or automatically grasped to draw several inches of the filmstrip from the cassette shell to wind the leader portion onto a take-up spool in the camera.

A problem inherent in conventional cassettes is that the leader portion may be inadvertently wound into the cassette shell before the filmstrip is exposed in a camera. Once the leader portion is lost in this way, it is very difficult to retrieve.

SUMMARY OF THE INVENTION

A film cassette is disclosed wherein a filmstrip in roll form is stored within the cassette shell and has a leader portion that projects from an exterior end of a film passage slit in the cassette shell to permit the filmstrip to be drawn out of the shell. According to the invention, a tow bar is secured to the leader portion. The tow bar normally is positioned in covering relation with the exterior end of the film passage slit to prevent the leader portion from being moved into the cassette shell and includes engageable means which may be engaged in a camera, for example, to separate the tow bar from the cassette shell to draw the filmstrip out of the shell for exposure purposes.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
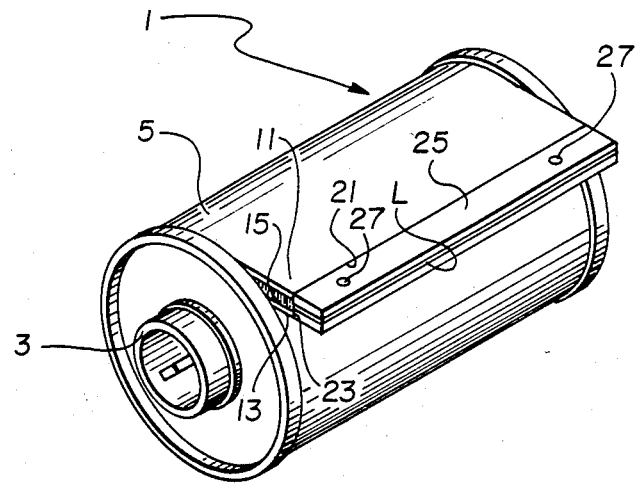
FIG. 1 is a perspective view of a film cassette according to a preferred embodiment of the invention.
Figure 2:
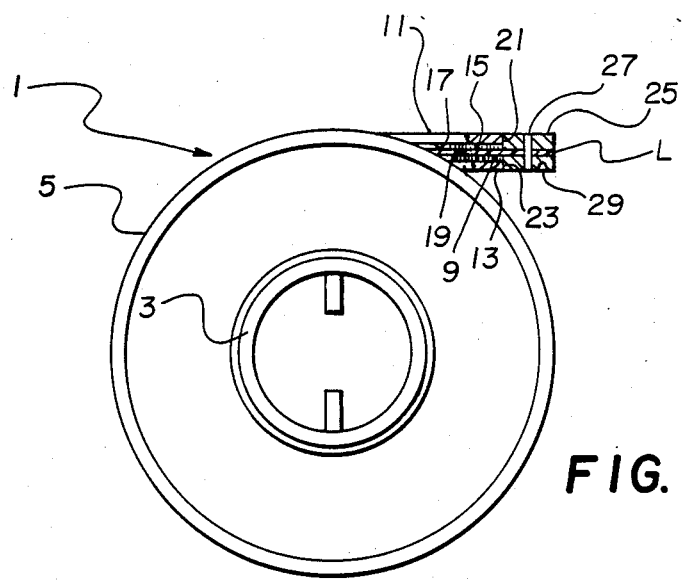
FIG. 2 is a side elevation view, partly in section, of the film cassette shown in FIG. 1.
Figure 3:
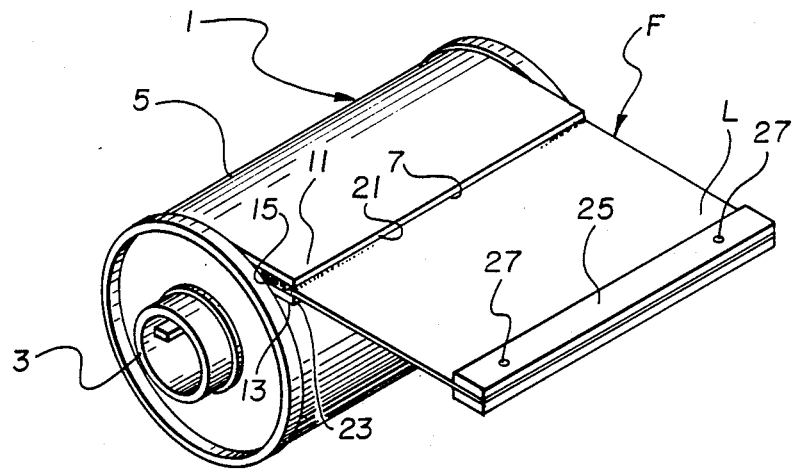
FIG. 3 is a perspective view similar to FIG. 1 showing a length of film drawn out of the cassette shell.

Referring now to the drawings, FIGS. 1-3 show a 35 mm film cassette 1 wherein a filmstrip F is stored in roll form on a known flanged spool 3 (details not shown) rotatably supported within a cylindrical cassette shell or housing 5. A leader portion L of the filmstrip F slightly projects from an exterior end 7 of a slit or "mouth" 9 of the cassette shell 5 defined by a relatively short pair of lip-like substantially parallel extensions 11 and 13 of the shell. A light-trapping velvet or plush 15 lines the interior sides 17 and 19 of the respective lips 11 and 13. Although the plush 15 is shown in FIG. 2 as ending at the forward tips 21 and 23 of the two lips 11 and 13, it may protrude slightly beyond the forward tips.

According to the invention, a rigid tow bar 25 is secured by known means, such as two stakes 27, to the leader portion L. The tow bar 25 is normally positioned as shown in FIGS. 1 and 2 against the forward tips 21 and 23 of the two lips 11 and 13 in covering relation with the exterior end 7 of the slit 9 to prevent the leader portion L from being inadvertently wound into the cassette shell 5. Preferably, the tow bar 25 is configured to appear integrated with the two lips 11 and 13. Engageable means, such as a small cavity 29 in the two bar 25, is provided for engagement in a camera, for example, to separate the tow bar from the cassette shell 5 to draw the filmstrip F out of the shell for exposure purposes. See FIG. 2.

ALTERNATE EMBODIMENT

Figure 4:
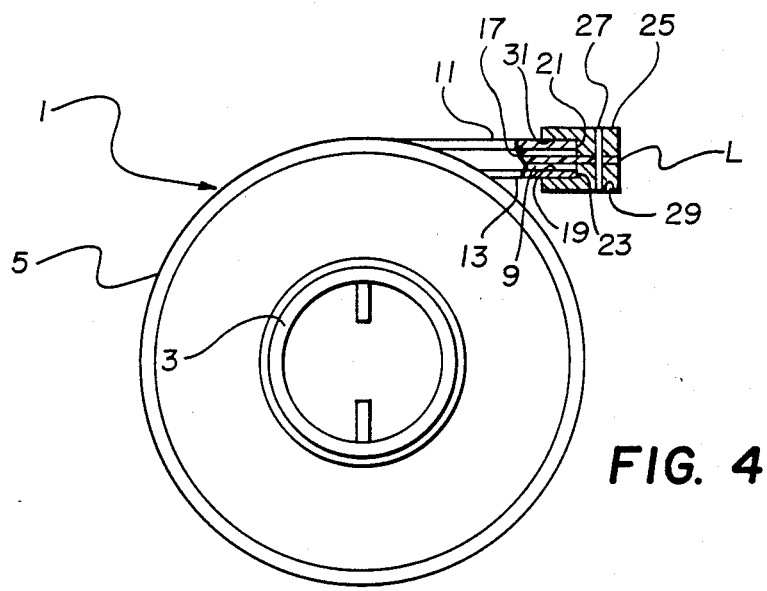
FIG. 4 is a side elevation view, partly in section, of an alternate embodiment of the film cassette.

FIG. 4 shows an alternate embodiment of the film cassette 1 wherein the tow bar 25 includes a rectangular-shaped cavity 31 that receives at least the forward tips 21 and 23 of the two lips 11 and 13 to prevent ambient light from entering the slit 9 at its exterior end 7. In this instance, therefore, the plush 15 is not included.

The invention has been described with reference to a preferred embodiment and an alternate embodiment. However, it will be appreciated that variations and modifications can be effected within the ordinary skill in the art without departing from the scope of the invention.

I claim:

1. An improved film cassette wherein a filmstrip in roll form is stored within a cassette shell having a generally cylindrical shape and a relatively short pair of lip-like substantially parallel extensions, and a leader portion of said filmstrip projects from an exterior end of a film passage slit located between said lip-like extensions to permit the filmstrip to be drawn out of the cassette shell, and wherein the improvement comprises:

a tow bar secured to said leader portion normally in covering relation with the exterior end of said film passage slit to prevent the leader portion from being moved into said cassette shell, said tow bar being physically configured to appear integrated with said lip-like extensions as a completely conforming continuation of the extensions beyond the exterior end of the film passage slit.

2. The improvement as recited in claim 1, wherein said tow bar includes light shield means for preventing ambient light from entering said film passage slit at its exterior end.

3. An improved film cassette wherein a filmstrip in roll form is stored within a cassette shell having a generally cylindrical shape and a relatively short pair of lip-like substantially parallel extensions, and a leader portion of said filmstrip projects from an exterior end of a film passage slit located between said lip-like extensions to permit the filmstrip to be drawn out of said cassette shell, and wherein the improvement comprises:
   a tow bar secured to said leader portion, said tow bar normally in covering relation with the exterior end of said film passage slit to prevent the leader portion from being moved into said cassette shell, said tow bar including a cavity for receiving said lip-like extensions at the exterior end of the film passage slit to form a light-trap to prevent ambient light from entering the slit at its exterior end.

* * * * *

UNITED STATES PATENT AND TRADEMARK OFFICE
CERTIFICATE OF CORRECTION

PATENT NO. : 4,913,368
DATED. : April 3, 1990
INVENTOR(S) : William C. Atkinson

It is certified that error appears in the above-identified patent and that said Letters Patent is hereby corrected as shown below:

IN THE TITLE    Change "FILM CASSETTE" to
--FILM CASSETTE WITH TOWBAR--.

Signed and Sealed this

First Day of October, 1991

*Attest:*

HARRY F. MANBECK, JR.

*Attesting Officer*    *Commissioner of Patents and Trademarks*